(12) United States Patent
Devathi

(10) Patent No.: US 8,910,998 B1
(45) Date of Patent: Dec. 16, 2014

(54) SYSTEMS AND METHODS FOR ALTERING THE COLOR, APPEARANCE, OR FEEL OF A VEHICLE SURFACE

(71) Applicant: Srinivas S. Devathi, Austin, TX (US)

(72) Inventor: Srinivas S. Devathi, Austin, TX (US)

( * ) Notice: Subject to any disclaimer, the term of this patent is extended or adjusted under 35 U.S.C. 154(b) by 0 days.

(21) Appl. No.: 14/227,859

(22) Filed: Mar. 27, 2014

(51) Int. Cl.
| | |
|---|---|
| *B60J 10/00* | (2006.01) |
| *B60J 11/00* | (2006.01) |
| *B21D 53/88* | (2006.01) |
| *F17C 13/00* | (2006.01) |
| *B62D 65/08* | (2006.01) |

(52) U.S. Cl.
CPC ............... *B60J 11/00* (2013.01); *B21D 53/88* (2013.01); *F17C 13/00* (2013.01); *B60J 10/0088* (2013.01)
USPC ........ 296/136.07; 53/131.1; 53/411; 427/238; 427/294

(58) Field of Classification Search
USPC ...................... 53/131.1, 284.7, 403, 411, 467; 156/145, 212, 213; 296/136.02, 296/136.07; 427/230, 238, 294, 295, 350; 428/31, 34–36.92
See application file for complete search history.

(56) References Cited

U.S. PATENT DOCUMENTS

| | | | | |
|---|---|---|---|---|
| 1,584,518 | A * | 5/1926 | Drake ........................... | 150/166 |
| 2,020,255 | A * | 11/1935 | Copeman ..................... | 428/440 |
| 2,807,356 | A * | 9/1957 | Blum ............................ | 206/335 |
| 4,294,483 | A * | 10/1981 | Ferris ......................... | 296/136.02 |
| 4,635,996 | A * | 1/1987 | Hirose ....................... | 296/136.07 |
| 4,810,540 | A * | 3/1989 | Ellison et al. ................... | 428/31 |
| 4,964,667 | A * | 10/1990 | Reis et al. ..................... | 296/95.1 |
| 5,042,836 | A * | 8/1991 | Swanson ....................... | 280/770 |
| 5,056,817 | A * | 10/1991 | Fuller ............................ | 280/770 |
| 5,158,324 | A * | 10/1992 | Flesher ......................... | 280/770 |
| 5,242,206 | A * | 9/1993 | Heck ......................... | 296/136.02 |
| 5,246,516 | A * | 9/1993 | Rias ............................. | 156/202 |
| 5,342,666 | A * | 8/1994 | Ellison et al. ................... | 428/46 |
| 5,350,000 | A * | 9/1994 | Wang ........................... | 150/166 |
| 5,429,406 | A * | 7/1995 | Huang ......................... | 296/95.1 |
| 5,664,825 | A * | 9/1997 | Henke et al. ............. | 296/136.02 |
| 5,738,403 | A * | 4/1998 | Tyson ....................... | 296/136.02 |
| 5,804,297 | A | 9/1998 | Colvin et al. | |
| 5,890,525 | A * | 4/1999 | Shores .......................... | 150/166 |
| 6,017,079 | A * | 1/2000 | Warner ..................... | 296/136.07 |
| 6,030,702 | A | 2/2000 | Matsui et al. | |
| 6,044,881 | A * | 4/2000 | Welch et al. .................. | 150/166 |
| 6,056,347 | A * | 5/2000 | D'Adamo ................ | 296/136.02 |
| 6,439,644 | B1 * | 8/2002 | Jester ....................... | 296/136.02 |

(Continued)

FOREIGN PATENT DOCUMENTS

| | | |
|---|---|---|
| CA | 2236759 | 12/1998 |
| CN | 102126870 A | 7/2011 |

(Continued)

*Primary Examiner* — Glenn Dayoan
*Assistant Examiner* — Paul Chenevert
(74) *Attorney, Agent, or Firm* — Hulsey Calhoun, PC

(57) ABSTRACT

Systems and methods for altering the appearance and/or texture of a vehicle surface include installing a vest relative to a vehicle surface such that an exterior side of the vest, spaced from the vehicle surface, defines a fluid-tight space between the vehicle surface and the exterior side of the vest. Visual media can be provided into and from the fluid-tight space using one or more ports, the exterior side being at least partially transparent or translucent such that the visible media within the fluid-tight space are visible through the exterior side of the vest, thereby allowing the repeatable alteration of the appearance of the surface.

23 Claims, 4 Drawing Sheets

(56) References Cited

U.S. PATENT DOCUMENTS

| | | | |
|---|---|---|---|
| 6,491,335 B1* | 12/2002 | Cohill | 296/136.07 |
| 6,551,432 B1 | 4/2003 | Spain et al. | |
| 7,320,824 B2 | 1/2008 | Ohgane et al. | |
| 7,360,820 B2* | 4/2008 | Tellez | 296/136.02 |
| 7,640,698 B2* | 1/2010 | Graham | 52/2.17 |
| 7,677,637 B2* | 3/2010 | Aydar et al. | 296/136.07 |
| 7,740,912 B2* | 6/2010 | Uhlianuk et al. | 427/385.5 |
| 7,868,778 B2* | 1/2011 | Kenwright | 340/686.6 |
| 2005/0269738 A1* | 12/2005 | Christen | 264/236 |
| 2006/0103165 A1* | 5/2006 | Ward | 296/136.02 |
| 2007/0138829 A1* | 6/2007 | Leyendecker et al. | 296/136.02 |
| 2007/0278817 A1* | 12/2007 | Dorsey | 296/136.07 |
| 2011/0014297 A1 | 1/2011 | Lee et al. | |
| 2014/0065327 A1* | 3/2014 | Kramer et al. | 428/34 |

FOREIGN PATENT DOCUMENTS

| | | |
|---|---|---|
| CN | 102671844 A | 9/2012 |
| EP | 0 261 815 A2 | 8/1987 |
| KR | 1020030082106 | 10/2003 |

* cited by examiner

SYSTEMS AND METHODS FOR ALTERING THE COLOR, APPEARANCE, OR FEEL OF A VEHICLE SURFACE

FIELD

Embodiments usable within the scope of the present disclosure relate, generally, to devices, systems, and methods usable to alter the visual appearance and/or feel (e.g., texture) of an object (e.g., a surface thereof), and more specifically, systems and methods usable to efficiently and cost-effectively change the color, visual appearance, and/or other characteristic of automobiles and/or other vehicles.

BACKGROUND

Conventionally, portions of the body of an automobile (e.g., pieces of metal framework, panels, and/or similar materials) are provided with a desired visual appearance (e.g., color, reflectiveness, a glossy/metallic sheen, etc.) through the application of paint to an exterior surface thereof. After application, the paint must be permitted to dry, which can be facilitated through the application of air and/or heat, or simply permitted to occur via the passage of time. Optionally, a protective, clear coating, such as a painted coating and/or an adhesive film, can be provided over the paint. When it is desired to change the color of a vehicle, the original paint must be removed (e.g., through solvents and/or physical/mechanical means), and the process must be repeated. Both the application of an original color to a vehicle, and the alteration of that original color, can be time-consuming and expensive processes. As such, after the initial purchase of a vehicle, individuals are inclined to repaint their vehicles only rarely. Many individuals refrain from repainting and/or customizing the exterior colors and/or other visual and/or tactile aspects of their vehicle entirely, and simply retain a single cosmetic appearance and/or texture throughout the life of the vehicle.

Due to the time required to paint an automobile and permit the paint to dry, the application of paint to cars and/or other vehicles can become a bottle-neck in the assembly process of vehicles, significantly increasing the overall manufacturing time required to produce a vehicle, while occupying machinery and/or space in a manner that can slow or limit the overall number of vehicles that can be manufactured simultaneously. For example, a typical process for manufacturing a painted vehicle includes manufacturing body portions of a vehicle at a press shop and/or body shop, producing what is termed a "body in whites," due to the materials (e.g., steel, aluminum, alloys, carbon composites, plastic, fiberglass, and/or other composite materials) that provide the body portions with a white and/or silver color. The body portions are subsequently transported to a paint shop, where they are dipped in a positively-charged protective dip intended to attract and/or absorb protective coats and sealants, then brushed. Subsequent to this step, the body portions are transported to a color shop, where manual or automated equipment can be used to paint each portion a selected color, typically using acrylic enamels or similar types of paint. Many large vehicle manufacturers consume an estimated 18,000 liters of paint per day or more through this process. The painted body portions must be dried, typically for multiple hours at high temperatures (e.g., approximately 140 degrees Fahrenheit), which slows the manufacturing process and associated throughput. It is estimated that approximately one third of the total capital investment in a facility for production of automobiles relates to painting vehicle body panels and other portions.

The application of multiple layers of pigmented paints to automobile body portions requires elaborate facilities, large spaces, and significant expense. For example, a sizeable area with sufficient floor space for one or multiple vehicles must be maintained, in a clean-room environment, to allow the spraying of paint and clear coat, and the baking and curing of these components. Additionally, disposal, drainage, evaporation, and/or runoff of many solvent-based paints and related solutions has become of increasing environmental concern and/or subject to one or more regulations.

Because the color of a vehicle can only be modified through time-consuming and costly procedures, consumers restrict purchases of vehicles to those having a preferred color, shifting the burden of this expense and inconvenience to manufacturers and dealers. Vehicle manufacturers and dealers must maintain a sizeable inventory of vehicles, of various models, each in multiple colors, increasing the cost of manufacture, as generally identical vehicles that differ only in cosmetic appearance must be constructed and stored for future purchase. This practice also creates a significant overhead expense in the form of large warehouses and dealership lots necessary to store a large number of vehicles, transportation costs required to move such vehicles, and the logistical difficulties inherent in moving and/or acquiring vehicles of a preferred color/appearance/texture at a given location not currently in stock at the request of a consumer.

A need exists for an efficient and cost-effective system and method for altering the color and/or visual appearance, and/or the tactile/texture/feel of a vehicle, or any other object or surface, thereby reducing lost time, reducing expense, increasing manufacturing productivity, and reducing or eliminating many of the difficulties inherent in maintaining and transporting inventories, while providing consumers with the ability to flexibly alter characteristics of their vehicle or any other surface, repeatedly.

SUMMARY

Embodiments usable within the scope of the present disclosure include systems and methods for altering the visible appearance and/or tactile experience/texture of a vehicle surface (e.g., a body portion/panel of a vehicle). While embodiments described herein focus on the application of the disclosed systems and methods to automobiles and/or other types of vehicles as one exemplary use, it should be understood that embodiments usable within the scope of the present disclosure could be used to alter the visual and/or tactile characteristics of any object or portion thereof.

In use an at least partially transparent and/or at least partially translucent object, hereafter termed a "vest," is provided into association with at least a portion of a surface (e.g., of a vehicle or other object). A vest can include an edge (e.g., the perimeter thereof) secured, directly or indirectly, to respective portions of the surface (e.g., the perimeter of the surface or another suitable portion), and an exterior side (e.g., extending between the shape defined by the edge) that is at least partially transparent and/or translucent, and spaced a distance from the surface to define an enclosed space (e.g., a fluid-tight space) between the surface and the exterior side, such that media (e.g., colored fluids and/or similar media) within the space can be visualized through the exterior side of the vest. The vest can include one or more ports (e.g., one-way valves, or bidirectional/multidirectional valves usable as an inlet and outlet ports, or other similar flow control means) for communicating between the fluid-tight space within the vest and a region exterior to the space. In use, the one or more ports can receive visible media into the space and to flow visible media from the space, allowing repeated use of the space to display visible (e.g., colored) media therein through the exterior side of the vest. The space can have any dimensions without departing from the scope of the present disclosure; however in an embodiment, the space can be generally thin (e.g., ranging in thickness from one micron to five millimeters), intended for containing a thickness of a visible medium sufficient to impart a desired visual characteristic without requiring excessive time to flow visible media into and/or from the space.

While a vest can be formed from any generally durable material able to form an enclosed space capable of retaining a fluid, in an embodiment, the vest can be formed from polyester, acrylic, fiberglass, polyethylene, plastic, silicone, polypropylene, polystyrene, polyester, glass, fiber, thermoplastic, thermoset, latex, polymer fibers, polyvinyl chloride, polyethylene terephthalate, nylon, vinyl, thermoplastic materials, thermoset materials, phenolics, furane resins, amino resins, epoxy, alkyds, allyl plastics, aminos, polyamides, polyethylene resins, polycarbonate, acrylic resin, cellulose acetate, cellulose nitrate, cellulose acetate butyrate, cellulose propionate, rubber, neoprene, Thiokol, nitrile, butyl rubber, silicone rubber, acetals, cellulosics, fluoroplastics, ionomers, polyimide, polyolefins, polysulfone, composites, polythene, epoxides, polyurethane, synthetic rubber, synthetic plastic, synthetic resin, other similar materials, composite materials, or combinations thereof. In an embodiment, the interior of the vest (e.g., adjacent to the space) can include a hydrophobic coating adapted to facilitate removal of media from the space (e.g., by repelling an aqueous and/or liquid medium and/or preventing interactions between the medium and the vest). For example, in an embodiment, a durable, water-resistant vest could include a vest body formed from acrylic materials and/or allyl plastics, having a silicone coating both on the exterior and interior surfaces thereof. Vests intended to be subjected to extreme conditions (e.g., vests applied to aircraft, subjected to thermal transients of up to 1700 degrees Fahrenheit) can be provided with an insulative coating, energy-absorbing materials (e.g., paraffinic hydrocarbons or plastic crystals), or similar materials.

While various embodiments can include a single-layer vest, placed directly over a vehicle surface to define a space between the surface and the exterior side of the vest for containing a visible medium, as described above, in other embodiments a two-layered vest can be used. For example, a vest can include an interior side (e.g., extending between the edge of the vest) that is placed in contact with and/or immediately adjacent to a vehicle surface, while the exterior side of the vest is spaced from the interior side to define an enclosed space between the interior and exterior sides of the vest. A sealant (e.g., an adhesive, caulking, an industry-standard sealant, one or more welds, etc.) can be disposed between the interior side of the vest and the surface to prevent passage of materials between the vest and the surface. Any manner of elastomer, adhesive, and/or sealant known in the art can be used without departing from the scope of the present disclosure, including without limitation, thermoplastic and/or thermosetting adhesives, such as cellulose nitrate, acetate, acrylic, cyanoacrylate, vinyl, polyester, epoxy, phenolics, ureas, silicones, or combinations thereof.

By way of example, vests can be produced by extrusion, injection molding, use of calendaring machines, compression molding, transfer molding, blow molding, sheet molding, reaction injection molding, rotational molding, solvent molding, sheet forming, thermoforming, laminating, casting, vacuum molding, and/or other similar processes. Materials can also be machined, as needed, e.g., by filing, sawing, drilling, tapping, turning, milling, etc. In an embodiment, the molding process can be used to apply a texture and/or decorative appearance to a vest, e.g., via a raised and/or depressed design, including without limitation, geometric patterns such as basket weave, pebble, leather-like, or fur-like textures. An alternate finish and/or texture could be applied to a vest using lacquers, enamels, overlays, and/or other types of coatings and/or treatments.

In an embodiment, the interior side of the vest and/or the surface itself can be provided with a neutral color (e.g., white) to facilitate visualization of media within the space, though in other embodiments, the color and/or characteristics of the interior side and/or surface can be selected to enhance, modify, and/or otherwise interact with the appearance generated by visible media within the space.

Embodied vests can be secured to a surface using a variety of methods, including, without limitation, welding, laser welding, ultrasonic welding, heat sealing, heat fusion, crimping, soldering, brazing, adhesives, pressure-sensitive adhesives, contact adhesives, hot adhesives, hot gas welding, infrared welding, receiving at least one fastener (rivets, etc.), compressively retaining the extension between the surface and an adjacent object (e.g., two abutting body portions of a vehicle or a body portion of a vehicle and a frame member). For example, an extension of the vest can protrude from the edge thereof, and the extension can be secured to the surface, such that attachment of the vest to the surface does not interfere with the enclosed space.

In addition to the single-layer and double-layered vests described above, in an embodiment, a surface could be provided with an integrated vest. For example, a body portion of a vehicle could include an at least partially transparent or translucent exterior (e.g., the exterior side of an integrated vest), that defines an enclosed space within a portion of the vehicle body portion into and from which media can be flowed. Combinations of the above embodiments can also be utilized, such as a vehicle with an at least partially transparent exterior having a single or double-layered vest installed behind the exterior layer for containing visible media.

In addition to modifying the color and/or visual appearance of a vehicle surface, vests can be used to alter the tactile experience/texture thereof. For example, the material of the vest, a coating thereon, and/or a surface treatment applied thereto can provide the vest with a desired external textural sensation (e.g., glossy, rubbery, silky, smooth, metallic, matte, bubbled, flakey, thorny, rough, stringy, etc.), such that interchanging the vest and/or modifying the coating and/or surface treatment thereof can allow the texture of the surface to be repeatedly altered.

In use, a vest can be provided into association with a vehicle surface, e.g., through any of the methods and/or embodiments described above, to define a fluid-tight space between the exterior side of the vest and the surface. A visible medium can then be provided into the space (e.g., through a port). In various embodiments, a vehicle with which a vest and a first medium have already been installed/associated can be provided for subsequent alteration of the color/texture thereof. Visible media can include any substance flowable into and from the space that provides a visible characteristic, such as a desired color, to the vest. While conventionally, a surface, such as a body portion of a vehicle, is painted, and various paint-like substances could be used as a visible medium, unlike conventional paint, the visible medium provided into the enclosed space can remain in a liquid and/or fluid state (e.g., without drying). In an embodiment, the visible medium can be adapted to remain flowable at ambient temperatures and pressures and/or over a significant range of conditions, such as temperatures ranging from −37 degrees Fahrenheit to 150 degrees Fahrenheit. For example, the visible medium can include propylene glycol, glycerol, and/or other "antifreeze" components adapted to remain in a liquid state over a broad range of temperatures. Additionally, it should be noted that visible media are not limited to liquids; colored gasses, suspensions, slurries, and/or emulsions containing solid materials, (e.g., glitter, sand, powder, metallic flakes, etc.), flowable solids (sand, beads, etc.), oils, resins, waxes, polymers, and the like, and any combinations thereof, can be provided into and removed from the enclosed space, as desired.

When it is desired to remove the first medium (e.g., to provide a different medium into the vest to generate a different visible appearance), one or more conduits can be engaged with one or more ports associated with the vest, and a suction pressure can be generated at a port to remove the first medium from the space. In an embodiment, an intermediate medium (e.g., water, a wash fluid, a paint thinner/remover, a hydrophobic fluid, etc.) can be injected into the space to displace any remaining quantities of the first medium and/or to alter the first medium to facilitate removal thereof. A suction pressure can be generated to remove the intermediate medium, and in an embodiment, a gas (e.g., hot air or another gas) can be injected into the space to dry the space. A second medium can then be provided into the space via a conduit/port.

Embodiments usable within the scope of the present disclosure thereby enable a vehicle surface to be provided with a reusable enclosed space into which visible media can be provided and removed, enabling the visual appearance of the vehicle to be changed repeatedly and efficiently, and in a cost-effective manner.

BRIEF DESCRIPTION OF THE DRAWINGS

In the detailed description of various embodiments usable within the scope of the present disclosure, presented below, reference is made to the accompanying drawings, in which.

Figure 1:
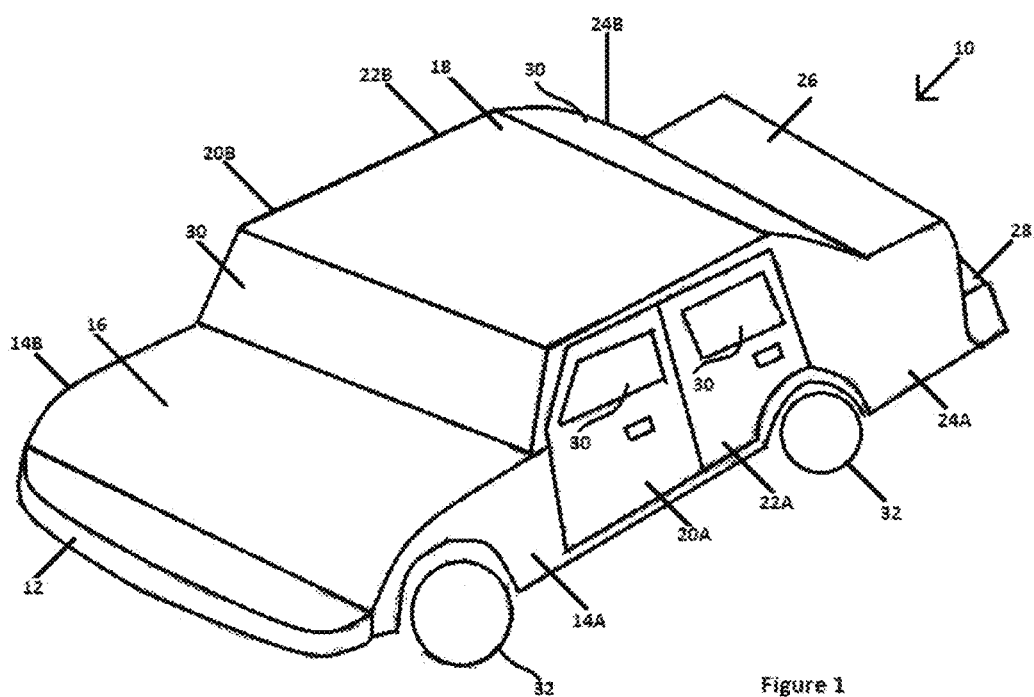
FIG. 1 depicts a perspective view of a vehicle incorporating an embodiment of a system usable within the scope of the present disclosure.

One or more embodiments are described below with reference to the listed Figures.

DETAILED DESCRIPTION OF THE EMBODIMENTS

Before describing selected embodiments of the present invention in detail, it is to be understood that the present invention is not limited to the particular embodiments described herein. The disclosure and description herein is illustrative and explanatory of one or more presently preferred embodiments of the invention and variations thereof, and it will be appreciated by those skilled in the art that various changes in the design, organization, order of operation, means of operation, equipment structures and location, methodology, and use of mechanical equivalents may be made without departing from the spirit of the invention.

As well, it should be understood the drawings are intended illustrate and plainly disclose presently preferred embodiments of the invention to one of skill in the art, but are not intended to be manufacturing level drawings or renditions of final products and may include simplified conceptual views as desired for easier and quicker understanding or explanation of the invention. As well, the relative size and arrangement of the components may differ from that shown and still operate within the spirit of the invention as described throughout the present application.

Moreover, it will be understood that various directions such as "upper", "lower", "bottom", "top", "left", "right", and so forth are made only with respect to explanation in conjunction with the drawings, and that the components may be oriented differently, for instance, during transportation and manufacturing as well as operation. Because many varying and different embodiments may be made within the scope of the inventive concept(s) herein taught, and because many modifications may be made in the embodiments described herein, it is to be understood that the details herein are to be interpreted as illustrative and non-limiting.

Embodiments usable within the scope of the present disclosure relate to systems and methods usable to alter the visible and/or tactile characteristics of a vehicle surface by providing at least a portion of the surface with a vest, as defined above, the vest defining an enclosed (e.g., fluid-tight) space between the exterior side of the vest and the surface into which visible media can be provided and removed, the media being visible through an at least partially transparent and/or translucent portion of the vest (e.g., an exterior side thereof). The tactile characteristics of the vehicle surface (as well as visible qualities) can be altered through the material of the vest, provision of a coating thereto, application of a texturizing process thereto, or combinations thereof. While various embodiments above and below are described with reference to systems for altering the appearance of a car/automobile (e.g., sedan, microcar, coupe, hatchback, sub-compact car, compact car, mid-size car, luxury car, full size car, convertible, passenger van, minivan, JEEP, sport utility vehicle, pickup truck, van camper, minibus, recreational vehicle, all-terrain vehicle, limousine, etc.) or other vehicle (e.g., bicycles, mopeds, motorcycles, three-wheeled vehicles, trucks, busses, trains, aircraft, helicopters, military vehicles, spacecraft, rockets, lawnmowers, ships, boats, motorboats, construction/earth moving equipment, go-carts, golf carts, or any other mode of transport), it should be understood that embodiments usable within the scope of the present disclosure could be used to alter the visible appearance of any surface. Exemplary applications of embodied systems could include clothing, shoes, and/or other garments and accessories, mannequins, interior and/or exterior walls of houses and other buildings and associated fixtures (e.g., cabinets, counters and other building infrastructure), vending machines (e.g., automatic teller machines, movie rental machines, machines for dispending food and drink, etc.), electronic devices (e.g., laptop computers, tablets, cellular telephones, and other handheld devices), appliances (e.g., refrigerators, washers, dryers, etc.), furniture of all types, and any other surface. Futuristic vehicles and/or other surfaces (e.g., aerial vehicles) can also be used in conjunction with embodiments described herein without departing from the scope of the present disclosure. Depending on the nature of the surface to which a vest will be installed, the design and characteristics of the vest can be modified. For example, a vest intended for use with an aircraft could be designed to withstand thermal gradients, air friction, and the like, while a vest intended for use with objects having prolonged exposure to sunlight could be designed with ultraviolet resistance and similar components to resist degradation.

Specifically, however, FIG. 1 depicts an automobile (10) (a sedan), having a number of body portions that form the exterior thereof. Conventionally, colored paint is applied to each body portion via a painting process, as described above; however, embodiments described herein can include one or more vests installed into association with each of the body portions of the vehicle to define an enclosed space into which visible media can be provided and removed, instead of the application of conventional paints and other related materials. The body portions of depicted automobile (10) include a front bumper (12), a left front panel (14A) opposite a right front panel (14B), a bonnet and/or hood (16), a roof (18), a left front door (20A) opposite a right front door (20B), a left rear door (22A) opposite a right rear door (22B), a left rear panel (24A) opposite a right rear panel (24B), trunk (26), and a rear bumper (28). Each of the body portions can have a vest installed in association therewith, such that the visible appearance thereof can be altered through the provision (e.g., injection) and/or removal of visible media from the enclosed spaces defined between each vest and each respective body portion. The tactile experience of each body portion can similarly be altered, e.g., through the installation of vests having desired textures.

FIG. 1 also depicts portions of the automobile (10) that are not typically painted, these portions including a plurality of windows (30), and the wheels (32) of the automobile (10). It should be understood that while traditional application of paint to such portions of a vehicle is not practical, in various embodiments usable within the scope of the present disclosure, certain visible media could be provided into association with the windows (30) and/or wheels (32), within the limits of the necessary functionality and movement of such portions and any applicable safety regulations. For example, a vest provided in association with a window could be provided with a tinted and/or glare-reducing medium, media that resist fogging of windows, media that resist formation of ice on windows, durable media that can resist impact and/or breakage of the window, and/or other similar media. In an embodiment, such media could include a thermally conductive medium able to receive and conduct current and/or heat for melting ice and/or snow on a window, evaporating moisture, and the like. In a similar manner, a vest having media therein could be used to insulate and/or reflect heat (e.g., for use during summer and/or in warm climates), or potentially to insulate and retain heat within a vehicle or other location (e.g., for use during winter or in cold climates).

While embodiments referenced herein are described with emphasis toward alteration of the visual appearance of a vehicle surface, in various embodiments, the provision of a vest and/or media within an enclosed space defined by the exterior side of the vest and the surface can provide additional durability and/or cushioning to a vehicle in the event of a collision. Further, the exodus of media from an impacted and/or damaged vest may potentially be useful in the performance of forensics and/or reconstruction following such a collision. Additionally, as described above, provision of a vest to a surface can also be used to provide a desired texture and/or tactile characteristic.

It should be understood that while FIG. 1 depicts the automobile (10) as a sedan having thirteen body parts, each of which can have one or more vests installed in association therewith, each vest having a generally matching and/or complementary shape to the corresponding vehicle body part, an automobile could include any number of body portions of any shape and/or dimensions. Generally, a vest will be provided with a shape matching that of the underlying body portion, such that an enclosed space of generally uniform thickness (e.g., from one micron to five millimeters in thickness) is defined across the exterior of the automobile (10).

Figure 2:
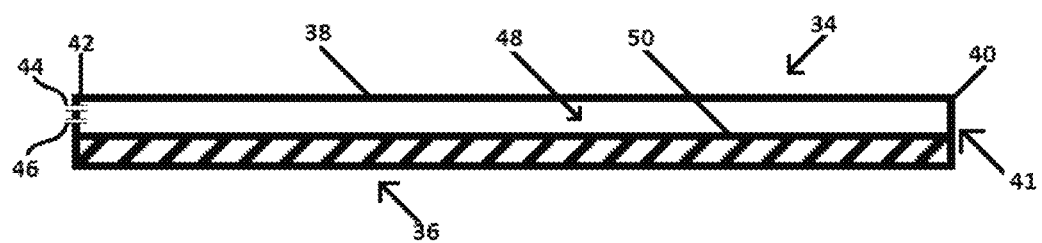
FIG. 2 depicts a diagrammatic side view of an embodiment of a system usable within the scope of the present disclosure.

Referring now to FIG. 2, a diagrammatic side view of an embodiment of a system usable within the scope of the present disclosure is shown. Specifically, a vest (34) is shown installed in association with a surface (36) (e.g., a body portion of an automobile, such as that shown in FIG. 1). The depicted vest (34) is shown having an exterior side (38), and an edge (41), which when viewed from the side presents a first end (40) and a second end (42). The exterior side (38) and/or edge (41) can be partially or wholly transparent and/or translucent (e.g., to enable the visualization of media therethrough). The exterior side (38) is spaced from the surface (36) to define a space (48) therebetween, into which visible media can be provided and removed. An inlet port (44) (e.g., a check valve, ball valve, butterfly valve, or similar one-way valve) and an outlet port (46) are shown positioned at the second end (42), for accommodating the flow of visible media into and from the space (48), though it should be understood that any number and type of openings (e.g., ports, valves, etc.) could be positioned at any location along the vest (34) without departing from the scope of the present disclosure (e.g., a single bidirectional or multidirectional valve could be used in place of separate one-way valves, and/or multiple valves could be used in tandem to facilitate more rapid filling and draining of media in the space (48)). In an embodiment, the exterior (50) of the surface (36) can be provided with a neutral coloration (e.g., white) to facilitate visualization of the media within the space (48) through the exterior side (38) of the vest (34). In other embodiments, however, the surface (36) can be provided with any desired color and/or feature, including those that produce a visible interaction with media within the space (48). In an embodiment, the vest (34) can be formed from high density polyester, acrylic, fiberglass, and/or similar materials having sufficient transparency/translucency and durability. The surface (36) (e.g., the exterior (50) thereof) can be provided with anti-rust and/or anti-corrosive coatings to protect the surface (36) from contact with media within the space (48).

The vest (34) can be secured relative to the surface (36) through a variety of means, as described above and below. For example, in an embodiment, adhesive could be provided about the edge (41) of the vest (34) thereby securing the vest (34) directly to the surface (36). Other embodied methods of securing vests relative to surfaces are depicted and described, for example, in FIGS. 7, 8A and 8B.

Figure 3:
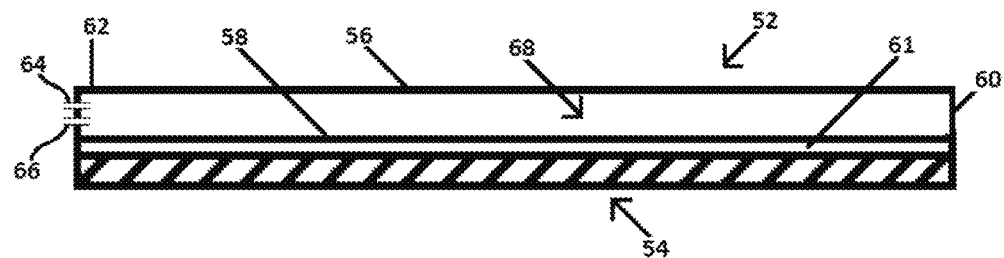
FIG. 3 depicts a diagrammatic side view of an embodiment of a system usable within the scope of the present disclosure.

While FIG. 2 depicts an embodiment of a vest (34) that includes a single layer (e.g., the exterior side (38)) positioned over the surface (36) to define a space (48), FIG. 3 depicts a diagrammatic side view of an alternate embodiment of a vest (52) positioned in association with a surface (54) having an exterior side (56) spaced from the surface (54) and an interior side (58) generally adjacent thereto. A space (68) for containing a visible medium is defined between the exterior and interior sides (56, 58). As such, in an embodiment, the exterior side (56) can be at least partially transparent and/or translucent, while the interior side (58) and/or the underlying surface (54) can have a neutral coloration to facilitate visualization of media within the space (68). The vest (52) is further shown having an edge, which when viewed from the side presents first and second ends (60, 62), with an inlet port (64) and an outlet port (66) shown positioned at the second end (62). In use, the interior side (58) of the vest (52) prevents contact between media within the space (68) and the underlying surface (54). In an embodiment, a sealant (e.g., an industry standard sealing material) can be provided within the gap (61) between the vest (52) and the surface (54) (e.g., between the interior side (58) and the surface (54)) for preventing the passage of materials between the vest (52) and surface (54), thereby protecting the surface (54) from corrosion, rust, and/or other forms of damage or deterioration that could be caused by the ingress of moisture and/or materials underneath the vest (52). In an embodiment, the vest could be made from low or medium-density polyester, polyethelene, acrylic, and/or other similar materials.

Figure 4:
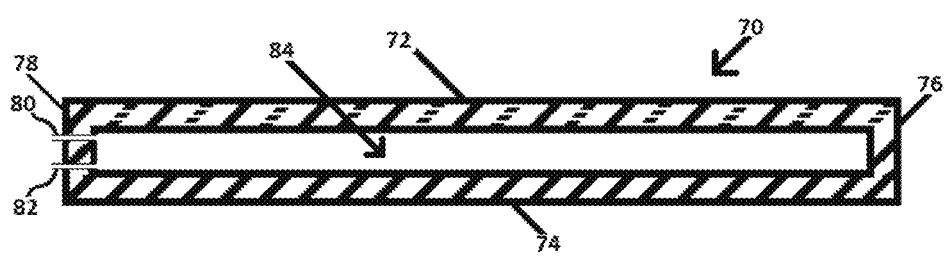
FIG. 4 depicts a diagrammatic side view of an embodiment of a system usable within the scope of the present disclosure.

FIG. 4 depicts a diagrammatic side view of an embodiment of a system usable within the scope of the present disclosure in which a vest (70) is integrated within a surface (e.g., as part of a vehicle body or similar object). The depicted integrated vest (70) includes an at least partially transparent and/or translucent exterior side (72) opposite an interior side (74) to define a space (84) therebetween for containing visible media. The exterior and/or interior sides (72, 74) can be a portion of the object for which a visual appearance is altered. For example, an automobile can include a transparent exterior panel (e.g., formed from glass, fiberglass, plastic, or a similar transparent and/or translucent material), through which fluids or similar media can be visualized, thereby defining a space between this exterior panel and an interior body portion of the vehicle. While historically, car body portions have been made predominantly from sheet metal, attempts to reduce the overall weight of vehicles has led to use of plastic bumpers, rocker panels, fender extensions, windows, door moldings, and the like. Many cars have also included fiberglass materials. Developments in plastic resin technology allow for production of plastic materials having greater impact strength than fiberglass, such as polycarbonates. As such, the integrated vest (70) can include a variety of strong, lightweight materials that can be at least partially transparent and/or translucent to enable visualization of media therein.

The depicted vest (70) includes an edge, which when viewed from the side presents first and second ends (76, 78), with inlet and outlet ports (80, 82) positioned at the second end (78). In such an embodiment, the interior side (74) can have a neutral coloration to facilitate visualization of media within the space (84). While the materials used in the embodiment depicted in FIG. 4 can vary depending on the structural requirements of the surface (e.g., durability of a vehicle in the event of a collision, etc.), in an embodiment, transparent materials forming the exterior side (72) can include acrylic, fiberglass, composites, and/or other similar transparent and/or translucent materials. It should be understood that while the combination of the interior and exterior sides (72, 74) within the depicted portion of a surface is referred to as a "vest," in the depicted embodiment, no vest separate and apart from the object to be altered, itself, is necessary—the depicted vest is integral with and is a part of the underlying object.

Combinations of the embodiments depicted above can also be used without departing from the scope of the present disclosure. For example, a single-layer vest could be installed to the underside of an at least partially transparent portion of a vehicle to define an enclosed space within a body portion of the vehicle, the vest protecting other internal portions of the vehicle body from contact with media within the space. Alternatively, a double-layer vest could be provided behind an at least partially transparent portion of a vehicle body.

Figure 5:
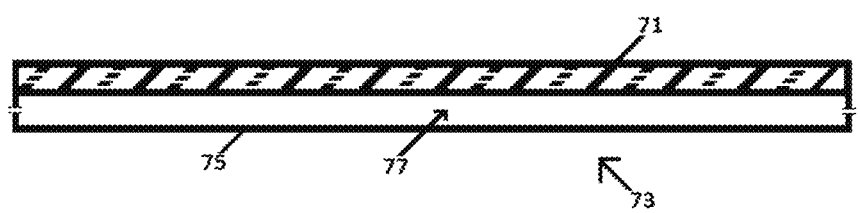
FIG. 5 depicts a diagrammatic side view of an embodiment of a system usable within the scope of the present disclosure.

For example, FIG. 5 depicts a vest (73) installed beneath (e.g., over the interior side) of a surface (71), such as a transparent and/or translucent body portion of a vehicle, the vest (73) having an exterior side spaced from the surface (71) to define a space (77) therebetween, extending along the underside of the surface. As such, visible media within the space (77) can be visualized through the transparent surface (71). In an embodiment, the exterior side (75) of the vest can be neutrally colored and/or otherwise designed to facilitate visualization of media within the space (77). The vest (73), surface (71) or combinations thereof can include one or more inlet or outlet ports usable to communicate media into and from the space (77).

Figure 6:
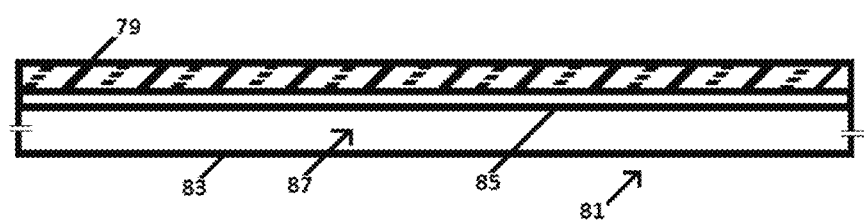
FIG. 6 depicts a diagrammatic side view of an embodiment of a system usable within the scope of the present disclosure.

While FIG. 5 depicts a vest having a single layer installed beneath a surface, FIG. 6 depicts an embodiment in which a double-layered vest (81) is installed in association with the underside of an at least partially transparent and/or translucent surface (79). The depicted vest (81) includes an exterior side (83) spaced from an interior side (85) adjacent to the surface (79), such that a space (87) is defined between the sides (83, 85) of the vest (81). Visible media can be provided into and from the space, e.g., using inlet and outlet ports as described above, such that the media can be visualized through the at least partially transparent surface (79).

It should be noted that multiple vests could be installed in association with a single body portion of a vehicle, and/or a vest having multiple interior pockets/compartments could be used to provide the vehicle surface with multiple discrete regions that can each be altered differently, to enable creation of customized designs (such as through provision of differing media into each vest or compartment). For example, a custom design could be provided to a surface through the provision of a first desired color and/or texture to a first portion or region of a vest, and a second desired color and/or texture to a second region. Alternatively or additionally, use of differing visible media having different characteristics (density, viscosity, etc.) could be used to simulate the appearance of discrete regions within a vest. Custom designs could also be provided through the application of different characteristics to different body portions of a vehicle. For example, an "American Flag" design could be created through the provision of a red-colored medium to the hood, and trunk of a vehicle, a blue-colored medium to the doors thereof, and a white colored medium to the roof, or various other combinations and arrangements could be used.

Independent of the embodiment of vest used, in various embodiments, the interior of the vest can be provided with coatings to repel water and/or other fluids to facilitate eventual removal of media from the enclosed space and prevent undesired interaction between the vest and the media within. For example, silicone or a strongly hydrophobic composite, polymer, and/or other material can be used to coat the inner surface of the vest such that aqueous fluids or other fluids may "roll" across the inner surface of the vest without significantly interacting therewith. In addition to having properties of transparency and/or translucency, in various embodiments, the outer surface of the vest can be provided with various coatings and/or characteristics. For example, an outer finish can be applied to provide a desired textural sensation and/or a visual appeal—e.g., the outer finish of the vest could be glossy, rubbery, silky, smooth, metallic, matte, stringy (e.g., producing strands), bubbled, flakey, thorny, rough, and/or any other desired texture or appearance (e.g., geometric basket weave, pebbled, etc.). Vests could also be constructed and/or treated to emulate the texture of fur, leather, Rexene, and/or other similar materials. Such exterior finishes could be provided through use of various manufacturing processes and/or by using one or more coatings. In an embodiment, the material and/or coating and/or exterior finish of the vest can be adapted to withstand extreme weather, moisture, wind, sunlight, heat, cold, and/or other ambient conditions. For example, vests can be provided with ultraviolet stabilizers (e.g., benzotriazole UV stabilizers, hindered amine UV stabilizers, benzoate UV stabilizers, and/or other similar components). In various embodiments, vests can include pigments, fillers (e.g., wood, flour, quartz, limestone, clay, metal powders), antioxidants, blowing agents, colorants, plasticizers, reinforcements, stabilizers, or combinations thereof. Coatings, finishes, and/or additives can be used to improve wear, scratch, and chemical resistance, and/or add aesthetic (e.g., visible and/or tactile) appeal. Exterior coatings/finishes could also include lacquers, enamels, and/or decorative overlays.

Figure 7:
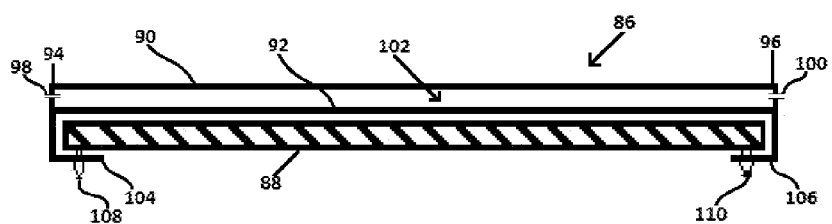
FIG. 7 depicts a diagrammatic side view of an embodiment of a system usable within the scope of the present disclosure.

FIG. 7 depicts a diagrammatic side view of a vest (86) installed in association with a surface (88), illustrating one possible method of installation thereof. In the depicted embodiment, the vest (86) includes an at least partially transparent and/or translucent outer side (90), an inner side (92) positioned adjacent to the surface (88), and an edge, which when viewed from the side presents a first end (94) with an inlet port (98), and a second end (96) with an outlet port (100). An enclosed space (102) is defined between the inner and outer sides (90, 92), usable to contain media (injected and/or removed from the space (102) via the ports (98, 100)).

An extension (e.g., a flap and/or piece of material) is shown extending from the edge, which when viewed from the side presents a first portion (104) of the extension extending from the first end (94) and a second portion (106) extending from the second end (96). The extensions can allow interaction and/or manipulation of the vest (86) without intersecting and/or interfering with the enclosed space (102). For example, in the depicted embodiment, the extension is shown positioned along the underside of the surface (88) (e.g., folded, stretched, and/or otherwise adhered or associated with the underside). A first fastener (108) (e.g., a rivet, screw, nail, clip, clamp, clasp, button, staple, one or more adhesives, or other means of attachment) is shown securing the first portion (104) of the extension to the underside of the surface (88), while a second fastener (110) is shown securing the second portion (106) of the extension. Additional fasteners can be secured, as necessary, about the edge of the vest (86). It should be understood that while FIG. 7 depicts fasteners (108, 110) securing the vest (86) to the surface (88), any method of engagement, including adhesives, welding, frames, or the like, could be used without departing from the scope of the present disclosure. In an embodiment, a sealant can be provided between the vest (86) and the surface (88) (e.g., between the inner side (92) and the surface (88)) to prevent the ingress of materials between the vest (86) and surface (88). While FIG. 7 depicts an embodiment of a vest (86) having two layers (90, 92), similar to that shown in FIG. 3, it should be understood that the depicted method of installation can be used with other vest configurations described herein.

Figure 8A:
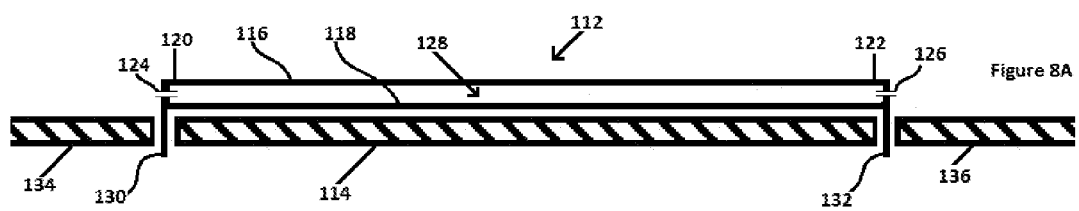
FIG. 8A depicts a diagrammatic side view of an embodiment of a system usable within the scope of the present disclosure.

FIG. 8A depicts a diagrammatic side view of a vest (112) installed in association with a surface (114). The vest (112) is shown including an at least partially transparent outer side (116) opposite an inner side (118), to define an enclosed space (128) therebetween, and an edge, which when viewed from the side presents a first end (120) with an inlet port (124) opposite a second end (122) with an outlet port (126). An extension is shown extending from the edge, which when viewed from the side presents a first portion (130) extending from the first end (120), and a second portion (132) extending from the second end (122). In the depicted embodiment, the first portion (130) of the extension is shown compressively retained between an end of the surface (114) and an abutting end of an adjacent surface (134), while the second portion of the extension (132) is shown compressively retained between an opposing end of the surface (114) and an abutting end of a second adjacent surface (136). For example, a vest can be secured in association with a body portion of a vehicle by retaining an extension thereof between adjacent portions of the vehicle that surround the vest on all sides, eliminating the need for additional fasteners; however, it should be understood that fasteners, adhesives, welding, etc., can be used in addition to compressive retention. Also, it should further be understood that combinations of fastening methods can be used, e.g., for different vests installed on different portions of a vehicle and/or other surfaces, as desired and/or practical.

Figure 8B:
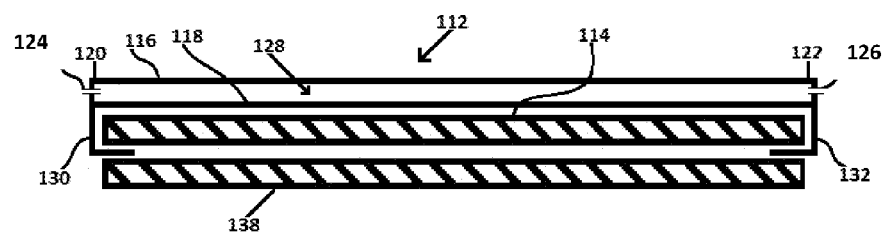
FIG. 8B depicts a diagrammatic side view of an embodiment of a system usable within the scope of the present disclosure.

FIG. 8B depicts a diagrammatic side view of the vest (112) of FIG. 8A, installed in association with the surface (114), illustrating an alternate configuration for attachment. Specifically, while FIG. 8A depicts an extension of the vest (112) compressively retained between the surface (114) and adjacent abutting surfaces (134, 136), FIG. 8B depicts the extension (130, 132) of the vest (112) wrapped about the ends of the surface (114), such that an adjacent abutting surface (138) (such as a frame) beneath the surface (114) can compressively retain the vest (112) in association with the surface (114) by retaining the extension between the surfaces (114, 138). In various embodiments, the abutting surface (138) could include one or multiple elements (e.g., a frame having one or multiple pieces) that overlap the extensions (130, 132) without necessarily extending across the full width of the surface (114) above.

As such, it should be understood that in various embodiments, a vest can be removed and replaced from a surface if desired, such as an automobile accident or incident of vandalism in which a vest is torn and/or otherwise damaged, extreme weather conditions that damage a vest and/or alter a medium therein in a manner that inhibits removal, malfunctioning inlet or outlet ports, or the like. Generally, by disengaging the extension of the vest from the associated surface, the vest can be removed, and a replacement vest can be installed.

In use, after installation of any embodied vest to any manner of surface, to define a space between the exterior side of the vest and the surface, a visible medium can be provided into the space (e.g., through an inlet port). While conventionally, a vehicle or similar surface is colored using paint, conventional paint is intended to dry and/or harden/solidify after application. Conversely, visible media used within the scope of the present disclosure can be adapted to remain in a generally fluid state in a variety of conditions. For example, a visible medium could include a colored fluid having low viscosity (e.g., high flowability), and be adapted to remain in a liquid state (without drying or solidifying) at most ambient temperatures and pressures. In an embodiment, antifreeze agents, including but not limited to propylene glycol and/or glycerol, could be used within visible media to allow the media to remain fluid in extreme cold and heat. Industry standard antifreeze solutions can allow a fluid to remain in a liquid state at temperatures ranging from −37 to 150 degrees Fahrenheit. In an embodiment, visible media can be recyclable and/or easily disposable (e.g., in a manner having no environmental impact or minimal environmental impact). In an embodiment, visible media can include water glycol fluids and/or water-oil emulsions.

Visible media can be mixed and/or prepared on site or remotely, such that any possible color or shade in the palate could be created and provided into an enclosed space associated with a surface (e.g., by mixing media having primary colors in different quantities). The thickness of the enclosed space can also affect the shade and/or other facets of the appearance, such as by simulating the presence of multiple coats of paint using a thicker space. For example, a thin vest/space can be used to provide a surface with a generally light and/or pale color, while a thicker space could be used to provide a surface with a darker color. Additionally, it should be understood that usable visible media are not limited to colored liquids (or gasses); fluids can be mixed with other materials (e.g., fine particles such as glitter or sand or flakes of metal/minerals, oils, resins, beads etc.) to provide a space with a desired design or pattern. For example, a red color with golden lines could be provided to a body portion of a vehicle using a low viscosity red-colored liquid having oily (e.g., higher viscosity) gold liquid therein.

Similarly, visible media can include various additives to affect properties thereof, including additives that modify surface tension, improve flow/viscosity, improve the finished appearance, increase wet edge, improve pigment stability, improve temperature stability over larger ranges, control foaming, control skinning, and the like. Other types of additives can include catalysts, thickeners, stabilizers, emulsifiers, texturizers, adhesion promoters, ultraviolet stabilizers, flatteners (de-glossing agents), biocides, mineral controlling agents (e.g., for treating hard water), and the like. In various embodiments, properties common to conventional paint can be emulated using properties of the visible media, properties of the vest within which the media is contained, or combinations thereof. For example, any desired level of gloss, distinctiveness-of-image, hardness, abrasion resistance, weatherability (e.g., ultraviolet resistance), impact strength, thermal stability, chemical resistance, cleanability, adhesion, moisture resistance, and opacity can be obtained by modifying the properties of the visible media and/or the vest.

It should be readily understood that vests can be designed with internal or external features, compartments, and the like to enable custom designs (e.g., sport, university, or company logos, company or individual names, advertisements, etc.) to be provided to a vehicle or other surface. Vests could be adapted to contain lights (e.g., LEDs), display devices, or similar visual devices used in conjunction with visible media, the material of the vest protecting such devices from ambient conditions. Such devices could be adapted to function based on external conditions, such as the speed of a vehicle, application of the vehicle's brakes, etc. Stickers, laminates, labels, paints, and the like could be applied to the exterior of a vest, to be displayed in conjunction with the visible media therein (e.g., which could function as a backdrop and/or to enhance visibility of the overlaid item). In various embodiments, text and/or designs could be directly printed and/or applied to a vest during the manufacturing process thereof.

The ports through which media can be provided can include simple orifices (e.g., openings having a closure mechanism, such as flap), into which a pipe or other device can be inserted to rotate and/or otherwise displace the closure mechanism. The flap/closure mechanism can be biased toward a closed position such that the ports close subsequent to removal of a conduit or similar device therefrom. Various types of unidirectional valves (e.g., ball valves, check valves, etc.) known in the art can be used without departing from the scope of the present disclosure. In an embodiment, one or more bidirectional valves could be used, e.g., both as inlet and outlet ports. The size/scale of the inlet and outlet ports can be selected based on the size and/or thickness of the vest and that of the enclosed space. For example, a micro valve (such as those used in connection with intravenous devices, blood transfusion devices, and/or other types of medical devices) could be used in connection with a vest having a generally small and/or thin space therein. Similarly, various micro-electro-mechanical valves or similar devices could be used to manage and/or control fluid flow into and/or from the vest—the field of Micro-Electro-Mechanical Systems [MEMS], is an emerging field from which numerous advanced and innovative options and designs for valves and ports can be derived. Any manner of uni-directional, bi-directional, and/or multi-directional flow control device can be used without departing from the scope of the present disclosure.

Additionally, it should be noted that while FIGS. 1 through 8B depict vests having a single inlet port and a single outlet port, the exemplary diagrammatic embodiments are solely illustrative, and any number (e.g., from 1 to 3, or more) of inlet and/or outlet ports can be present without departing from the scope of the present disclosure, e.g., to increase the rate of provision and/or removal of media from the vest. Similarly, as described above, in various embodiments, one or more bi-directional valves could be used as both inlet and/or outlet ports. Further, in various embodiments, a vest could be provided with multiple pockets/enclosed spaces, each having at least one inlet and outlet port in communication therewith, e.g., for facilitating creation of custom designs and/or patterns.

As such, embodiments usable within the scope of the present disclosure include systems and methods capable of repeatedly modifying the visual appearance and/or texture of an automobile, or another surface, by providing a vest into association with the surface, thereby defining a reusable space into and from which visible media can be provided.

While various embodiments usable within the scope of the present disclosure have been described with emphasis, it should be understood that within the scope of the appended claims, the present invention can be practiced other than as specifically described herein.

What is claimed is:

1. A system for altering the appearance of a vehicle surface, the system comprising:
    a vest comprising an edge secured to the vehicle surface and an exterior side spaced from the vehicle surface to define a fluid-tight space between the exterior side of the vest and the vehicle surface, wherein the exterior side is at least partially transparent, at least partially translucent, or combinations thereof for enabling visualization of visible media in the fluid-tight space through the exterior side; and
    at least one port communicating between the fluid-tight space and a region exterior to the fluid-tight space for receiving visible media into the fluid-tight space, removing visible media from the fluid-tight space, or combinations thereof.

2. The system of claim 1, wherein the vest further comprises an interior side adjacent to the vehicle surface and spaced from the exterior side, and wherein the fluid-tight space is defined between the exterior side and the interior side.

3. The system of claim 2, further comprising a sealant between the interior side of the vest and the vehicle surface for preventing passage of materials between the interior side of the vest and the vehicle surface.

4. The system of claim 1, further comprising a visible medium within the fluid-tight space, wherein the visible medium comprises a fluid adapted to remain flowable at temperatures ranging from negative 37 degrees Fahrenheit to 150 degrees Fahrenheit.

5. The system of claim 4, wherein the visible medium comprises a quantity of visible solid or viscous components sufficient to remain flowable in the visible medium and through said at least one port.

6. The system of claim 1, wherein said at least one port comprises a bidirectional valve, a multidirectional valve, at least two one-way valves, or combinations thereof.

7. The system of claim 1, wherein the vehicle surface comprises a body portion of a vehicle, and wherein the vest comprises a shape that matches that of the body portion of the vehicle.

8. The system of claim 1, wherein edge comprises an extension associated therewith, and wherein the extension is adapted for securing the vest to the vehicle surface by welding, laser welding, ultrasonic welding, heat sealing, heat fusion, crimping, soldering, brazing, adhesives, pressure-sensitive adhesives, contact adhesives, hot adhesives, hot gas welding, infrared welding, receiving at least one fastener, compressively retaining an extension extending from the edge of the vest between the vehicle surface and an adjacent object, or combinations thereof.

9. The system of claim 1, wherein the fluid-tight space comprises a thickness ranging from 1 micron to 5 millimeters.

10. The system of claim 1, wherein the vest is at least partially formed from polyester, acrylic, fiberglass, polyethylene, plastic, silicone, polypropylene, polystyrene, polyester, glass, fiber, thermoplastic, thermoset, latex, polymer fibers, polyvinyl chloride, polyethylene terephthalate, nylon, vinyl, thermoplastic materials, thermoset materials, phenolics, furane resins, amino resins, epoxy, alkyds, allyl plastics, aminos, polyamides, polyethylene resins, polycarbonate, acrylic resin, cellulose acetate, cellulose nitrate, cellulose acetate butyrate, cellulose propionate, rubber, neoprene, Thiokol, nitrile, butyl rubber, silicone rubber, acetals, cellulosics, fluoroplastics, ionomers, polyimide, polyolefins, polysulfone, composites, polythene, epoxides, polyurethane, synthetic rubber, synthetic plastic, synthetic resin, or combinations thereof.

11. The system of claim 1, wherein the vest comprises an interior adjacent to the fluid-tight space, and wherein the interior comprises a hydrophobic coating adapted to facilitate removal of visible media from the fluid-tight space.

12. The system of claim 1, wherein the vest comprises at least one interior barrier, protrusion, or recession on an interior thereof adapted to provide the vest with a plurality of regions, spaces, or combinations thereof, each having at least one port associated therewith and adapted to receive media therein, remove media therefrom, or combinations thereof.

13. The system of claim 1, wherein the vest comprises an exterior having a material, a coating, a treatment, or combinations thereof adapted to provide the vest, and thereby the vehicle surface, with a glossy texture, a rubbery texture, a silky texture, a smooth texture, a metallic texture, a matte texture, a stringy texture, a bubbled texture, a flakey texture, a thorny texture, a rough texture, a geometrically patterned texture, a pebble-like texture, a fur-like texture, a leather-like texture, or combinations thereof.

14. The system of claim 13, wherein the vest is removably associated with the vehicle surface for enabling changing of the vest to alter the texture of the vehicle surface, the appearance of the vehicle surface, or combinations thereof.

15. The system of claim 1, wherein the exterior side of the vest and the fluid-tight space comprise an integral portion of the vehicle surface.

16. A method for altering the appearance of a vehicle surface, the method comprising:
providing a vest in association with the vehicle surface, wherein the vest comprises an exterior side spaced from the vehicle surface to define a fluid-tight space between the exterior side of the vest and the vehicle surface, and wherein the exterior side is at least partially transparent, at least partially translucent, or combinations thereof; and
providing a first visible medium into the fluid-tight space through at least one port communicating between the fluid-tight space and a region exterior to the fluid-tight space.

17. The method of claim 16, wherein the step of providing the vest into association with the vehicle surface comprises positioning an interior side of the vest adjacent to the vehicle surface and spaced from the exterior side, and wherein the fluid-tight space is defined between the exterior side and the interior side.

18. The method of claim 16, wherein the step of providing the vest into association with the vehicle surface comprises securing an extension extending from an edge of the vest to the vehicle surface by welding, laser welding, ultrasonic welding, heat sealing, heat fusion, crimping, soldering, brazing, adhesives, pressure-sensitive adhesives, contact adhesives, hot adhesives, hot gas welding, infrared welding, receiving at least one fastener, compressively retaining an extension extending from an edge of the vest between the vehicle surface and an adjacent object, or combinations thereof.

19. The method of claim 16, wherein the step of providing the vest into association with the vehicle surface comprises spacing the exterior side of the vest from 1 micron to 5 millimeters from the vehicle surface.

20. The method of claim 16, further comprising:
removing the first visible medium from the fluid-tight space through said at least one port; and
providing a second visible medium into the fluid-tight space through said at least one port.

21. The method of claim 20, wherein the step of removing the first visible medium from the fluid-tight space comprises flowing a wash fluid through said at least one port into the fluid-tight space to displace the first visible medium, alter the first visible medium, or combinations thereof, and removing the wash fluid from the fluid-tight space through said at least one port.

22. The method of claim 20, further comprising the step of drying the fluid-tight space after removing the first visible medium therefrom by flowing a gas into the fluid-tight space.

23. A method for altering the appearance of a vehicle surface, the method comprising:
providing a vest into association with a vehicle surface, wherein the vest comprises an exterior side spaced from the vehicle surface to define a fluid-tight space between the exterior side of the vest and the vehicle surface, wherein the exterior side is at least partially transparent, at least partially translucent, or combinations thereof, and wherein a first medium is disposed within the fluid-tight space and visible through the exterior side;
engaging at least one conduit to at least one port associated with the vest;
generating a suction pressure via said at least one conduit to draw the first medium through said at least one port to remove the first medium from the fluid-tight space;

injecting an intermediate medium via said at least one conduit through said at least one port and into the fluid-tight space to displace the first medium, alter the first medium, clean an interior of the vest, or combinations thereof;

generating a suction pressure via said at least one conduit to draw the intermediate medium through said at least one port to remove the intermediate medium from the fluid-tight space;

injecting a gas via said at least one conduit through said at least one port and into the fluid-tight space to dry the interior of the vest; and injecting a second medium via said at least one conduit through said at least one port and into the fluid-tight space to at least partially fill the fluid-tight space, wherein the second medium is visible through the exterior side.

\* \* \* \* \*